United States Patent [19]
Keller, Jr.

[11] 3,803,031
[45] Apr. 9, 1974

[54] FATTY OIL-WATER SEPARATION PROCESS

[75] Inventor: Howard F. Keller, Jr., Fullerton, Calif.

[73] Assignee: GBK Enterprises, Inc., Placentia, Calif.

[22] Filed: July 12, 1972

[21] Appl. No.: 271,017

[52] U.S. Cl............... 210/32, 210/40, 210/80, 210/DIG. 21
[51] Int. Cl............................ B01d 15/06
[58] Field of Search............ 210/23, 24, 32, 40, 65, 210/79, 80, 81; 260/425, 412.7

[56] References Cited
UNITED STATES PATENTS

| | | | |
|---|---|---|---|
| 3,574,329 | 4/1971 | Beavon | 210/80 |
| 3,354,188 | 11/1967 | Bock et al. | 260/425 X |
| 3,629,307 | 12/1971 | Marino et al. | 260/425 |
| 3,008,972 | 11/1961 | Mitani et al. | 260/425 |
| 3,436,260 | 4/1969 | Duff | 210/80 X |
| 3,455,819 | 7/1969 | Crits | 210/80 X |

Primary Examiner—John Adee
Assistant Examiner—Ivars Cintins
Attorney, Agent, or Firm—Donald Diamond

[57] ABSTRACT

Aqueous systems containing fatty constituents and particulate solids and having a pH from about 1 to about 4.8 are filtered through a finely divided, acid and alkali resistant filter media having a particle mesh size range from about 12 to about 60 at a rate from about 1 to about 50 gallons per minute per square foot of filter media surface area whereby fatty constituents and particulate solids are retained by the filter media and the effluent therefrom is clarified water.

The filter media is periodically regenerated by: (1) agitating the media in the presence of a saponifying alkaline solution to extract fatty constituents therefrom, (b) withdrawing the alkaline solution from the filter media, (c) passing fresh water through the filter media in the same direction of flow as that of the aqueous system to remove residual water soluble materials, and (d) backwashing the filter media with fresh water to remove insoluble and non-dispersible particulate solids.

14 Claims, No Drawings

FATTY OIL-WATER SEPARATION PROCESS

BACKGROUND OF THE INVENTION

This invention relates to a filtration process for producing clarified water from aqueous systems containing dispersions of fatty constituents and particulate solids.

The term "clarified water" as used herein refers to water having less than 100 parts per million of fatty constituents.

The term "fatty constituents" as used herein refers to hexane extractable fatty materials present in waste water from industrial processing such as edible oil refining processes and includes, for example, fatty acids, fats, fatty oils, fatty monoglycerides and fatty diglycerides.

In the processing of vegetable sources to obtain edible oils, the waste water from the various processing steps is pumped to a gravity separation station. This waste water contains fatty constituents in both dispersed and non-dispersed forms. A dispersion of fatty constituents can be formed in the conduit to the separation station when fatty acids combine, under appropriate conditions of concentration and turbulence, to form micelles which act as emulsifying agents for other fatty constituents such as triglyceride oils. At the separation station, the non-dispersed fatty constituents, which have an average specific gravity of about 0.79, rise to the surface and are removed for further commerical processing. The aqueous phase from the separation station, which contains dispersed fatty constituents, has, heretofore, been discharged as waste water. Since this water frequently contains from 600 to 1,000 parts per million of fatty constituents, it constitutes a source of environmental pollution.

PRIOR ART

It is disclosed in the prior art, U.S. Pat. No. 3,574,329 (Beavon, 1971), that dispersions of oil and particulate solids in aqueous systems can be resolved by filtering the aqueous system through a granular filter media, such as sand, having a particle size from about 0.1 to 5.0 mm in average diameter at a rate from about 2 to about 10 gallons per minute per square foot of filter media surface area to retain solids and pass an effluent consisting of clarified water or a mixture of water and oil which readily separates into defined layers of clarified water and oil. The filter media is periodically regenerated by stripping oil therefrom with either steam or an organic solvent and thereafter backwashing with water at a rate from about 3 to about 15 gallons per minute per square foot of filter media surface area to remove oil-free entrained solids from the filter bed.

It is pointed out in U.S. Pat. No. 3,574,329 that the oil-water system treated in accordance with the method defined therein may be obtained directly from any process source, such as petroleum refinery streams, oil purification streams, vegetable and oil processing streams and the like.

Although the foregoing prior art method can be used to resolve oil-water systems wherein the oil constituent is a hydrocarbon oil, it has been found that this method does not effectively resolve oil-water systems wherein the oil constituent is an oxyhydrocarbon oil such as a fatty acid or fatty oil derived from a vegetable oil processing stream. More specifically, it has been noted that shortly after start-up of a filtration run through a clean sand filter with oily waste water from a vegetable oil processing source, there is insufficient reduction in the hexane extractable fatty content of the effluent to meet clarified water requirements. In addition, the steam stripping step of the prior art does not remove unsaturated fatty oils from the filter media but, instead, causes the unsaturated fatty oils to polymerize and adhere to the media.

OBJECTS

Accordingly, an object of this invention is to provide an efficient and economical method for producing clarified water from aqueous systems containing dispersions of fatty constituents and particulate solids.

Another object of this invention is to provide a rapid and efficient filtration process for producing clarified water from aqueous dispersions of fatty constituents and particulate solids.

A further object of this invention is to provide an efficient and economical method for extracting from the filter media retained fatty constituents and particulate solids which accrue from the filtration step of the invention defined herein.

SUMMARY OF THE INVENTION

In accordance with this invention, a method is provided for producing clarified water from aqueous systems containing fatty constituents and particulate solids which comprises filtering an aqueous feed system containing the aforesaid constituents and having a pH from about 1.0 to about 4.8 through a finely divided, acid and alkali resistant filter media having a particle mesh size range from about 12 to about 60 at a rate from about 1 gallon per minute per square foot of filter media surface area to about 50 gallons per minute per square foot of filter media surface area whereby fatty constituents and particulate solids are retained by the filter media and the effluent therefrom is clarified water.

The filter media is periodically regenerated by: (a) agitating the filter media in the presence of a saponifying alkaline solution to extract fatty constituents therefrom, (b) withdrawing the alkaline solution from the filter media, (c) passing fresh water through the filter media in the same direction of flow as that of the aqueous feed system to remove residual water soluble materials, and (d) backwashing the filter media with fresh water at a rate from about 12 gallons per minute per square foot of filter media surface area to about 20 gallons per minute per square foot of filter media surface area to remove insoluble and non-dispersible particulate solids.

DETAILED DESCRIPTION

The aqueous systems, which can be treated in accordance with the method of this invention, are obtained from fatty oil processing and refining steps as oily waste water and, typically, contain dispersions of fatty constituents and particulate solids which do not separate from the aqueous phase by gravity settling procedures. Oils, for processing into refined fatty oils, may be obtained from animal, fish and vegetable sources by appropriate extraction processes.

The fatty constituents present in the dispersed phase of the oily waste water include, for example, fatty acids, fatty oils, fats, fatty monoglycerides and fatty diglycerides in which the hydrocarbon chains have from about 14 to about 22 carbon atoms. The particulate solids may be alkali insoluble materials. Hexane extractible fatty constituents in the dispersed phase of the oily waste water may vary from about 300 parts per million to about 1,000 parts per million or more.

The pH of the oily waste water from the fatty oil processing and refining steps may vary from about 1 to about 7. However, when the pH of the aqueous system is above about 4.8 the filtration step does not effectively resolve the dispersion. Therefore, it is necessary to adjust the acidity of the oily waste water, when required, to a pH below about 4.8 and, preferably, to a pH below about 4.0 in order for the filter media to extract fatty constituents and pass an effluent of clarified water. Adjustment to pH may be effected by adding a non-toxic acidifying agent as, for example, carbon dioxide, hydrochloric acid, sulfuric acid or phosphoric acid to the oily waste water prior to filtration to bring the pH thereof between about 1 and about 4.8 and, preferably, between about 1 and about 4.0. When the pH of the aqueous phase is 4.0 or less, the fatty oil content of the dispersed phase is reduced to, for example, about 300 parts per million.

The aqueous system is passed through a filter media contained within an appropriate vessel at a rate from about 1 gallon per minute per square foot of filter media surface area to about 50 gallons per minute per square foot of filter media surface area with an intermediate rate being from about 10 to about 40 gallons per minute per square foot of filter media surface area and a preferred rate being from about 15 to 30 gallons per minute per square foot of filter media surface area.

In general, the filter media has a particle mesh size range from about 12 to about 60 with an intermediate range from about 13 to about 50 and a preferred range from about 14 to 40. The term "mesh size" means U.S. Standard Sieve Series (1940) corresponding to National Bureau of Standards LC 584.

The filter media should be insoluble with respect to water and fatty constituents and resistant to acid and alkaline environments. Materials which can be used as the filter media include, for example, garnet ground slag, silica sand, ground anthracite, aluminum oxide, volcanic tuff, oil shale, volcanic slag, ground brick, magnesium oxide, glass, weighted organic polymers and mixtures thereof. A weighted organic polymer which can be used as the filter media is polypropylene weighted with barium sulfate.

The filter media may contain from about 2 to about 8 cubic feet of filter material for each square foot of filter media surface area. A multiple layer filter media wherein each layer has a particle mesh size range distinct from its adjoining layer, can be advantageously used in practicing the method of this invention. Typically, such layers are built upon a porous support bed from fine to coarse layers in order to promote gradient filtration. For example, a 3 feet high multiple layer filter bed may contain in ascending order a pea gravel support base, 2 feet of 20 to 40 mesh silica sand and a 1 foot layer of 14 mesh ground anthracite. In another example, a 3 feet high triple layer filter bed may contain in ascending order an 8 mesh garnet support base, a 1 foot layer of 36 mesh garnet, a 1 foot layer of 20 to 40 mesh silica sand and a 1 foot layer of 14 mesh ground anthracite.

In the filtration step, fatty constituents and particulate solids from the aqueous system are retained by the filter media and an effluent is passed through the media comprising clarified water. The clarified water is a non-polluting water containing less than 100 parts per million of fatty constituents and, generally, contains less than 10 parts per million of such constituents.

The filter media, at or prior to the time of saturation with fatty constituents and particulate solids as indicated by pressure increase and/or oil breakthrough, is regenerated by a multi-step process which includes alkaline extraction of fatty constituents, fresh water removal of residual water soluble materials and backwashing with fresh water to remove insoluble particulate solids.

Alkaline extraction of fatty constituents is effected by agitating the filter media in the presence of a saponifying alkaline solution. The saponifying alkaline solution is, preferably, an aqueous solution containing from about 0.005 lb. of sodium hydroxide per cubic foot of filter media to about 1.5 lbs. of sodium hydroxide per cubic foot of filter media. Potassium hydroxide and other appropriate alkaline materials can also be used as alkalizing agents. The alkaline solution is, advantageously, present in the filter vessel at a level corresponding to about the height of the filter media. The oily waste water which is being filtered can be used as the source of the aqueous medium to which an alkalizing agent is added in a suitable amount to provide the saponifying solution. Any suitable means can be used to agitate the filter media. In a preferred embodiment, agitation is brought about by introducing air into the bottom of the filter vessel at a pressure of about 4.5 psig for about 1 to about 20 minutes or more.

Following completion of the agitation step, the alkaline solution, which contains saponified fatty constituents, is withdrawn from the filter vessel. Residual water soluble materials are removed by passing fresh water, preferably under pressure, downwardly through the filter media. A volume of water equal to about the volume of the filter media is, generally, adequate for this purpose.

When the fatty constituents and residual water soluble materials have been extracted from the filter media, insoluble particulate solids are then removed from the media by backwashing with fresh water in a direction countercurrent to the flow of the aqueous system and at a rate from about 12 to about 20 gallons per minute per square foot of filter media surface area and, preferably, at a rate from about 15 to 18 gallons per minute per square foot of filter media surface area. After backwashing, the filter bed is ready for reuse.

Since the sequence of filtration and filter media regeneration can be repeated indefinitely, and since it is desirable to operate the filtration systems continuously, it is preferred, therefore, to operate two or more filters in parallel with one or more filters being used to filter the oily waste water while one or more filters are being regenerated.

The clarified water obtained by practicing the method of this invention may be returned to the edible oil processing units for reuse or discarded as non-polluting waste water.

EXAMPLES

The following examples further illustrate the invention.

EXAMPLE I

To a filter vessel 3 feet in diameter and 6.5 feet high, there was added 1 foot of 8 mesh garnet as a support base and 3 feet of 20 to 40 mesh ground green slag as a filter media. Vegetable oil refinery waste water having a pH from 2.6 to 3.7 and a fatty oil content from 272 to 310 parts per million was filtered through the media at a flow rate of 20 gallons per minute per square foot of filter media surface area for 1 hour and 45 minutes, at the end of which time the pressure across the filter increased to 35 psig from 22 psig. The effluent from this run contained from 2.4 to 6.4 parts per million of hexane extractible fatty constituents.

At the end of the run, the filter media was regenerated. The input and outlet lines were closed and the fluid in the filter vessel was drained so that the fluid level corresponded to the height of the filter media. 3 gallons of 50 Baume sodium hydroxide were added to the fluid. The filter media was agitated in the sodium hydroxide solution for 16 minutes by means of air introduced into the bottom of the filter vessel in order to extract fatty constituents. The air was turned off and the fluid was drained from the vessel under positive air pressure. 75 gallons of fresh water were added to the vessel and this water was drained under positive air pressure to remove residual water soluble materials from the filter media. The filter media was backwashed with fresh water for 10 minutes at rate of 15 gallons per minute per square foot of filter media surface area to remove insoluble and non-dispersible solids. The effluent from the backwash step was discharged into a solids sedimentation basin.

EXAMPLE II

This example illustrates the effect of the pH of the input oily waste water on the fatty oil content of the filtered effluent.

To the filter vessel described in Example I, there was added 1 foot of pea gravel as a support base, 2 feet of 20 to 40 mesh silica sand and 1 foot of 14 mesh ground anthracite. Vegetable oil refinery waste water was filtered through the media for 11 hours at a rate equivalent to 15 gallons per minute per square foot of filter media surface area. The pH and fatty oil content of the feed and effluent are set forth in Table A.

TABLE A

| Time | Feed pH | Feed oil, ppm | Effluent pH | Effluent oil, ppm |
|---|---|---|---|---|
| 0900 | 6.27 | 83 | 6.74 | 12. |
| 0915 | 6.52 | 71 | 6.86 | 4.2 |
| 0930 | 6.61 | 105 | 6.36 | 4.4 |
| 0945 | 6.52 | 215 | 6.82 | 105. |
| 1000 | 7.59 | 320 | 6.71 | 210. |
| 1030 | 2.58 | 510 | 3.90 | 13.7 |
| 1630 | 2.54 | 45 | 2.60 | 12.7 |
| 1700 | 2.65 | 53 | 2.70 | 1.5 |
| 1754 | 2.72 | 3040 | 2.89 | 1.3 |
| 1803 | 2.73 | 480 | 2.89 | 0.9 |
| 1900 | 2.67 | 76 | 2.90 | 2.5 |
| 2000 | 2.64 | 49 | 2.90 | 1.6 |

EXAMPLE III

To the filter vessel described in Example I, there was added 1 foot of 8 mesh garnet as a support base, 1 foot of 36 mesh garnet, 1 foot of 20 to 40 mesh silica sand and 1 foot of 14 mesh ground anthracite to provide a filter media.

Vegetable oil refinery waste water having an average fatty oil content of 1,150 parts per million was acidified with sulfuric acid to a pH of 1.5 and filtered through the media at a rate of 20 gallons per minute per square foot of filter media surface area. The average fatty oil content of the effluent was 2.8 parts per million. When the pressure reached 150 psig, the filter media was regenerated substantially in accordance with the procedure described in Example I except that 2 gallons of 50 Baume sodium hydroxide were added to filter vessel to effect saponification of the fatty constituents.

That which is claimed is:

1. A method for producing clarified water from aqueous systems containing fatty constituents and particulate solids which comprises:
    filtering an aqueous feed system containing fatty constituents and particulate solids and having a pH from about 1.0 to about 4.8,
    through a finely divided, acid and alkali resistant filter media having a particle mesh size range from about 12 to about 60 at a rate from about 1 gallon per minute per square foot of filter media surface area to about 50 gallons per minute per square foot of filter media surface area,
    whereby fatty constituents and particulate solids are retained by the filter media and the effluent therefrom is clarified water.

2. A method according to claim 1 wherein the aqueous feed system has a pH from about 1.0 to about 4.0.

3. A method according to claim 1 wherein the rate of flow of the aqueous feed system is from about 15 to about 30 gallons per minute per square foot of filter media surface area.

4. A method according to claim 1 wherein the particle mesh size of the filter media is from about 14 to about 40.

5. A method according to claim 1 wherein the filter media is silica sand.

6. A method according to claim 1 wherein the filter media is a multiple-layer filter bed with each layer having a particle mesh size range distinct from its adjoining layer.

7. A method according to claim 6 wherein the filter bed comprises distinctive layers of ground anthracite and silica sand.

8. A method according to claim 6 wherein the filter media comprises distinctive layers of ground anthracite, silica sand and garnet.

9. A method according to claim 1 wherein the filter media is periodically regenerated by:
    agitating the filter media in the presence of a saponifying alkaline solution to extract fatty constituents from said filter media,
    withdrawing said alkaline solution from said filter media,
    passing fresh water through said filter media in the same direction of flow as that of the aqueous feed system to remove residual water soluble materials, and backwashing the filter media with fresh water at a rate from about 12 gallons per minute per square foot of filter media surface area to about 20 gallons per minute per square foot of filter media surface area to remove insoluble particulate solids from the filter media.

10. A method according to claim 9 wherein the saponifying alkaline solution is a solution of sodium hydroxide.

11. A method according to claim 10 wherein the saponifying alkaline solution contains from about 0.005 lb. to about 1.5 lbs. of sodium hydroxide per cubic foot of filter media.

12. A method according to claim 9 wherein agitation of the filter media, during the alkaline solution treatment step, is effected by directing a stream of air upwardly through the filter media.

13. A method according to claim 9 wherein residual water soluble materials are removed from the filter media, following withdrawal of the saponifying alkaline solution, by passing pressurized water downwardly through the filter media.

14. A method according to claim 9 wherein the filter media is backwashed with fresh water at a rate from about 15 to 18 gallons per minute per square foot of filter media surface area.

* * * * *